United States Patent [19]
Denninger

[11] Patent Number: 5,952,961
[45] Date of Patent: Sep. 14, 1999

[54] LOW OBSERVABLE RADAR AUGMENTED GPS NAVIGATION SYSTEM

[75] Inventor: Valentine L. Denninger, Sunnyvale, Calif.

[73] Assignee: Trimble Navigation Limited, Sunnyvale, Calif.

[21] Appl. No.: 09/016,751

[22] Filed: Jan. 30, 1998

[51] Int. Cl.$^6$ .................................................. G01S 5/02
[52] U.S. Cl. .......................... 342/357.08; 342/357.02
[58] Field of Search .............................. 342/52, 75, 120, 342/351.11, 33, 34, 357.14, 358.08, 357.02

[56] References Cited

U.S. PATENT DOCUMENTS

| | | | |
|---|---|---|---|
| 5,202,695 | 4/1993 | Hollandsworth et al. | 342/357 |
| 5,451,963 | 9/1995 | Lempicke | 342/357 |
| 5,506,588 | 4/1996 | Diefes et al. | 342/357 |
| 5,548,293 | 8/1996 | Cohen | 342/357 |
| 5,820,080 | 10/1998 | Eschenbach | 244/183 |

*Primary Examiner*—Mark Hellner
*Attorney, Agent, or Firm*—Wagner Murabito & Hao

[57] ABSTRACT

The present invention comprises a low-observable radar altimeter augmented GPS (global positioning system) aircraft navigation system. The system of the present invention includes a GPS receiver, an attitude sensor, and a low-observable radar altimeter. The GPS receiver receives GPS signals and determines a position therefrom. The attitude sensor is coupled to the GPS receiver. The attitude sensor is adapted to receive GPS signals and determine a three dimensional attitude of the aircraft therefrom. The low-observable radar altimeter is also coupled to the GPS receiver and is coupled to the attitude sensor. The radar altimeter is adapted to measure an AGL (above ground level) altitude of the aircraft. The radar altimeter measures the altitude by employing a low-observable radar transmitter slaved to the attitude sensor. The radar altimeter uses the attitude sensor to maintain a radar beam in a substantially vertical attitude (e.g., parallel to the local gravity vector). The system of the present invention uses the AGL altitude to increase the accuracy of the position.

34 Claims, 12 Drawing Sheets

LOW OBSERVABLE RADAR AUGMENTED GPS NAVIGATION SYSTEM

TECHNICAL FIELD

The present invention relates generally to aircraft navigation systems. More specifically, the present invention relates to aircraft navigation receivers that operate with signals received from the Navstar Global Positioning System (GPS).

BACKGROUND ART

The aviation industry relies upon numerous navigation aids in order safely to take off, navigate enroute, and land aircraft. Among these, the instrument landing system (ILS) is the internationally accepted and standardized navigation aid for landing aircraft at properly equipped airports. However, to allow safer aircraft take offs and landings, to provide for precision approaches at airports not equipped with ILS, and to provide more accurate navigation information, GPS is increasingly being accepted as an alternative to traditional navigation aids.

As is well known in the aviation industry, GPS is a space based radio positioning network for providing users equipped with suitable receivers highly accurate position, velocity, and time (PVT) information. Developed by the United States Department of Defense (DOD), the space-based portion of GPS comprises a constellation of GPS satellites in non-geosynchronous 12 hour orbits around the earth.

Figure 1:
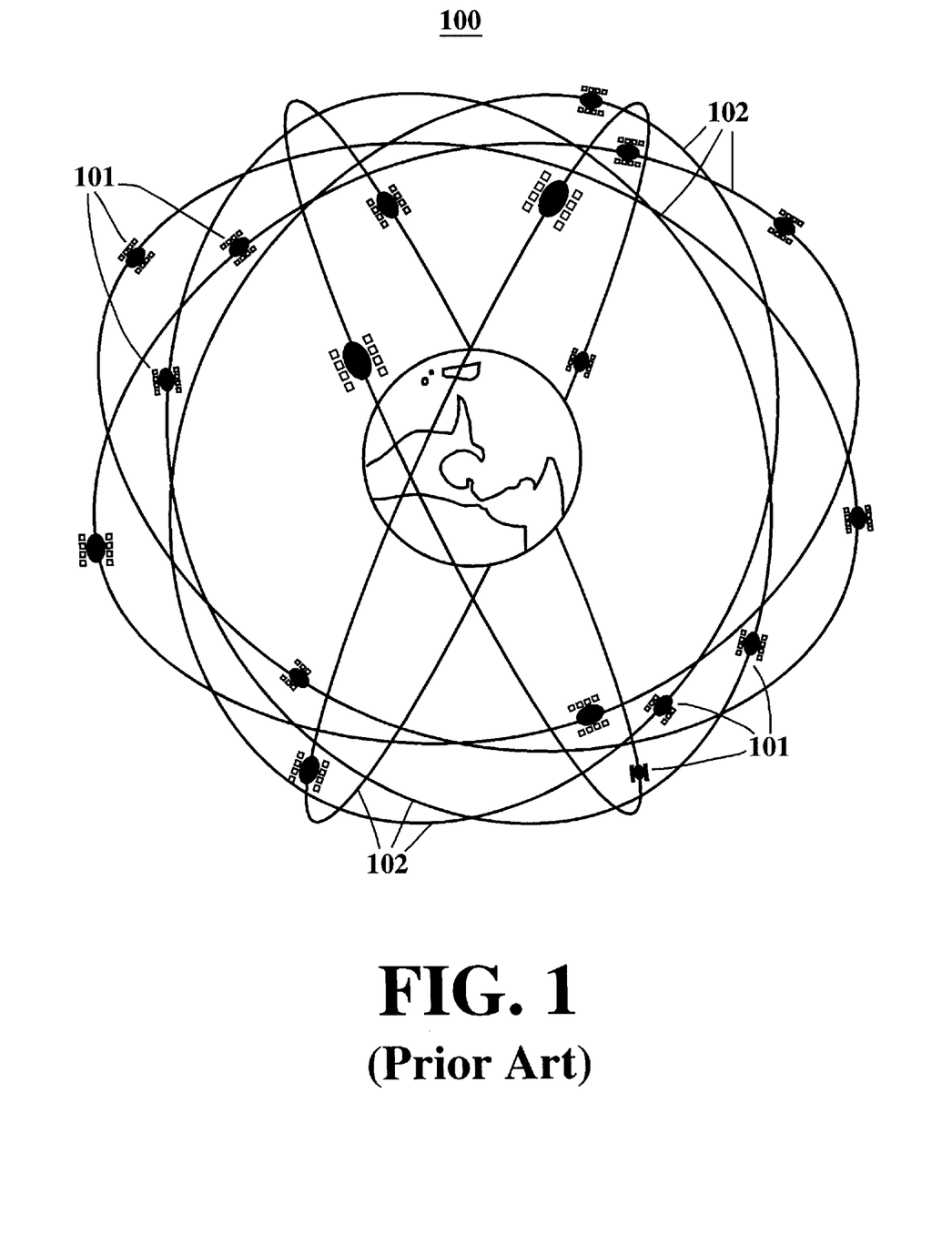
FIG. 1 shows a constellation of GPS satellites in orbit.

FIG. 1 shows the constellation 100 of GPS satellites 101 in orbit. The GPS satellites 101 are located in six orbital planes 102 with four of the GPS satellites 101 in each plane, plus a number of on orbit spare satellites (not shown) for redundancy. The orbital planes 102 of the GPS satellites 101 have an inclination of 55 degrees relative to the equator and an altitude of approximately 20,200 km (10,900 miles) and typically complete an orbit in about 12 hours. This positions each of the GPS satellites 101 in such a manner that a minimum of five of the GPS satellites 101 are normally observable (above the horizon) by a user anywhere on earth at any given time.

The orbiting GPS satellites 101 each broadcast spread spectrum microwave signals encoded with positioning data. The signals are broadcast on two frequencies, L1 at 1575.42 MHz and L2 at 1227.60 MHz, with the positioning data modulated using bi-phase shift keying techniques. A user receives the signals with a GPS receiver. The GPS receiver is adapted to demodulate the positioning data contained in the signals. Using the positioning data, the GPS receiver is able to determine the distance between the GPS receiver and a corresponding transmitting GPS satellite. By receiving signals from several of the GPS satellites 101 and determining their corresponding range, the GPS receiver is able to determine its position and velocity with a greater accuracy than conventional radio navaids.

The world wide availability and accuracy of GPS make the system particularly well suited for use in global flight operations and flight operations into and out of remote, unprepared or other such air strips or airports. The accuracy specifications of GPS are generally sufficient for all phases of flight down to and including non-precision approaches. Because of these characteristics, GPS receivers are increasingly being embraced by the United States defense establishment (e.g., US Air Force, Navy, etc.) and civilian carriers which require accurate, reliable navigation information in remote or unprepared areas. GPS, however, is not sufficiently accurate for vertical guidance in the precision approach and landing phases of flight.

There are several prior art methods currently in use or being considered for improving the accuracy of GPS for precision approach and landing. One such method involves using differential GPS (DGPS) techniques to improve the accuracy of the GPS signal. DGPS involves placing a local area augmentation system DGPS transmitter near the airport. The transmitter broadcasts DGPS corrections and integrity data to nearby aircraft which use the data to determine their accurate DPGS positions. Although the DGPS positions tend to be sufficiently accurate in the horizontal dimension, they have much less margin in the vertical dimension. This is primarily due to the geometric considerations of GPS. Although several satellites may be in view during a given instant, there is rarely a satellite in position to provide accurate vertical range measurements (e.g., a GPS satellite 101 directly overhead). Consequently, DGPS alone does not yield sufficient accuracy for the most demanding precision approaches (e.g., CAT-II or CAT-III precision approaches and landings).

Another prior art method involves the use of carrier phase DGPS techniques. One such prior art technique is the Integrity Beacon Landing System (IBLS) technique. Using IBLS, low power pseudolite transmitters are located on either side of the precision approach flight path to a runway. The pseudolite transmitters broadcast a signal, along with a signal being broadcast from a conventional DGPS transmitter located near the runway, such that an aircraft flying along the precision approach flight path is capable of tracking enough signal sources (GPS satellites and pseudolites) to unambiguously determine a carrier phase DGPS position accurate to within centimeters. This position is sufficiently accurate (including in the vertical dimension) to enable CAT-III precision approaches and landings. The problem with this solution, however, is that it requires expensive construction and maintenance of pseudolite transmitters, which often must occur off of the airport property.

The disadvantages of DGPS and IBLS are more significant with respect to the above stated applications (e.g., global flight operations and flight operations into and out of remote, unprepared air strips). Both DGPS and IBLS require the installation and maintenance of expensive, sensitive electronic ground-based transmitters in the airport vicinity. This equipment must be properly maintained in order to be relied upon. Both DGPS and IBLS require dependence upon these locally installed and maintained ground-based transmitters. In certain situations, particularly with regard to military applications, such dependence is unacceptable.

Additionally both DGPS and IBLS are completely non-functional in the event GPS signals are lost, jammed, interfered with, or otherwise unavailable. Both systems require the presence of receivable GPS signals in order to provide augmented positioning accuracy. Further, neither DGPS or IBLS adds any redundancy to the navigation systems already present on board a typical user aircraft (e.g., civilian air carrier or military transport). DGPS and IBLS typically augment an existing GPS receiver during the approach and landing phases as opposed to providing a separate, additional source of navigation information for added redundancy.

Thus, what is required is a system which provides improved positioning accuracy with respect to GPS. What is required is a system which provides sufficient accuracy in the vertical dimension to allow precision approaches and landings. The required system should be independent of any ground-based transmitters. In addition, the required system should provide an added degree of redundancy, providing an additional source of navigation information in conjunction with other pre-existing aircraft navigation instruments (e.g., inertial, ILS, TACAIN, etc.). The present invention provides a novel solution to the above requirements.

DISCLOSURE OF THE INVENTION

The present invention provides a system which provides an improved positioning accuracy in comparison to prior art GPS. The present invention provides sufficient accuracy in the vertical dimension to allow CAT-II or CAT-III precision approaches and landings and is independent of any ground-based transmitters. In addition, the system of the present invention provides an added degree of redundancy, providing an additional source of navigation information for use in conjunction with other pre-existing aircraft navigation instruments (e.g., inertial, ILS, TACAN, etc.).

In one embodiment, the present invention comprises a low-observable radar altimeter augmented GPS aircraft navigation system installed on an aircraft. The system of the present invention includes a GPS receiver, an attitude sensor, and radar altimeter. The GPS receiver receives GPS signals and determines a GPS position therefrom. The attitude sensor is coupled to the GPS receiver and is adapted to receive GPS signals and determine a three dimensional attitude of the aircraft therefrom. The radar altimeter is also coupled to the GPS receiver and to the attitude sensor. The radar altimeter is adapted to measure an AGL (above ground level) altitude of the aircraft. The AGL altitude is measured using a "low-observable" radar beam. The radar beam is low-observable in the sense that it includes RF characteristics which reduce its probability of detection (e.g., RF frequency agility, spread spectrum RF components, low transmitted power, etc.). The radar beam is emitted from a gimbaled antenna which is slaved to the attitude sensor. The radar altimeter actuates the antenna in response to the output of the attitude sensor to maintain the radar beam in a substantially vertical attitude with respect to the aircraft, ensuring an accurate AGL altitude measurement is obtained. The system of the present invention combines the AGL altitude, the GPS position, and terrain elevation data stored in a data base to generate an augmented position. This augmented position has greater accuracy than the GPS position. Hence, using the augmented position, the aircraft is able safely to execute precision approaches and landings independent of any ground-based transmitters.

In another embodiment, the system of the present invention also includes an optional inertial navigation system, an optional barometric altimeter, and an optional display. These optional components increase the advantages of the present invention by adding redundancy, reliability, and fault detection. In so doing, the system of the present invention provides an additional source of navigation information for use by the aircrew.

BRIEF DESCRIPTION OF THE DRAWINGS

The accompanying drawings, which are incorporated in and form a part of this specification, illustrate embodiments of the invention and, together with the description, serve to explain the principles of the invention.

Prior art

DETAILED DESCRIPTION OF THE INVENTION

Reference will now be made in detail to the preferred embodiments of the invention, a low-observable radar altimeter augmented GPS navigation system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention is a system which provides an improved positioning accuracy in comparison to prior art GPS navigation systems. The present invention provides sufficient accuracy in the vertical dimension to allow precision approaches and landings and is independent of ground-based transmitters. In addition, the system of the present invention provides an added degree of redundancy, providing an additional source of navigation information for use in conjunction with other pre-existing aircraft navigation instruments (e.g., inertial, ILS, TACAN, etc.).

Figure 2:
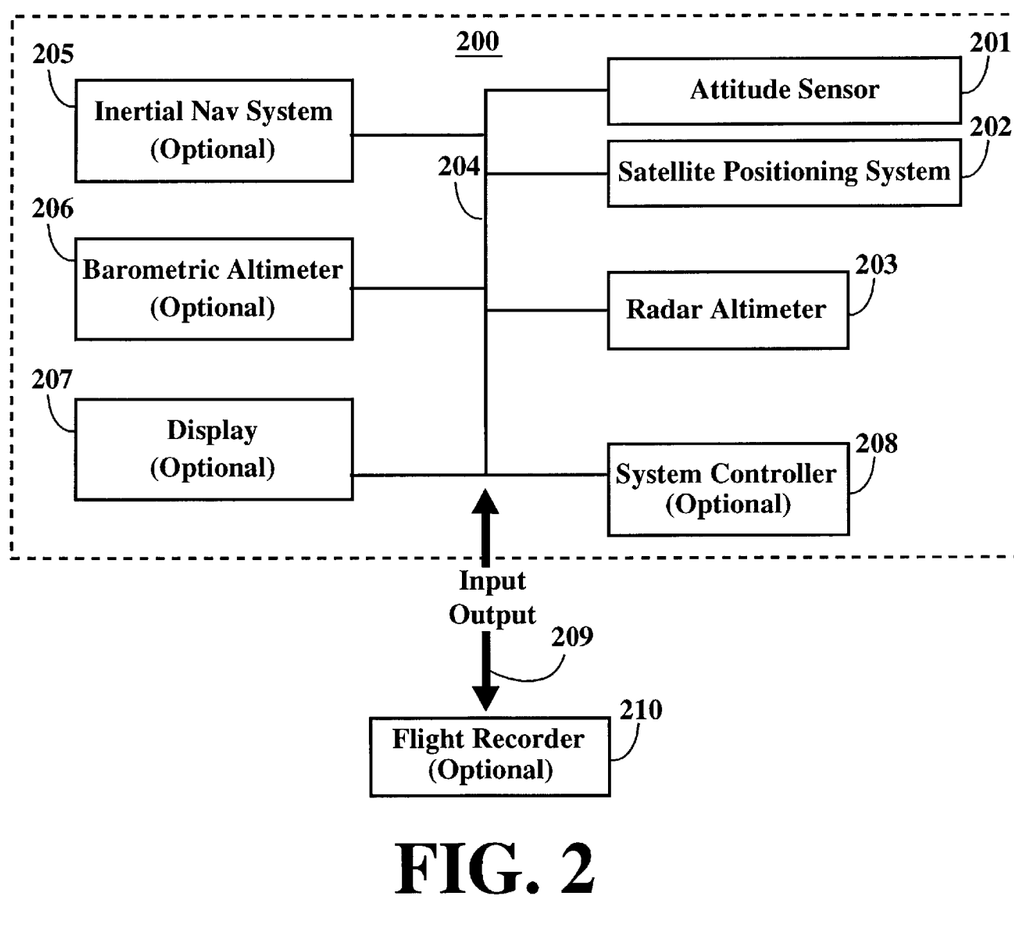
FIG. 2 shows a system in accordance with one embodiment of the present invention.

Referring to FIG. 2, a system 200 in accordance with one embodiment of the present invention is shown. System 200 is typically installed in an aircraft and used to provide accurate navigation information. In the present embodiment, system 200 includes an attitude sensor 201, a satellite positioning system 202, and a radar altimeter 203, each coupled to a bus 204. In addition, in the present embodiment, system 200 includes an optional inertial navigation system (INS) 205, an optional barometric altimeter 206, an optional display 207, and an optional system controller 208, coupled to bus 204. In addition, bus 204 is coupled to an optional external flight recorder 210 via an optional input-output port 209. The optional components 205–210 provide added functionality to system 200.

System 200, in accordance with the present invention, combines the inputs from attitude sensor 201, radar altimeter 203, and satellite positioning system 202 to generate an augmented position having greater accuracy than an unaugmented, conventional position, particularly with respect to the vertical dimension. Bus 204 functions by conveying data signals to facilitate communication between attitude sensor 201, satellite positioning system 202, and radar altimeter 203. Attitude sensor 201 functions by receiving satellite positioning signals and processing them to determine a 3 dimensional attitude with respect to an earth-centered, earth-fixed coordinate system. An additional software component executing within, for example, altitude computer 502, calculates the pointing angle offset from the airframe normal to the true vertical (e.g., local gravity vector) and drives the antenna's actuators. Radar altimeter 203 functions by measuring an AGL (above ground level) altitude of the aircraft. Satellite positioning system 202 functions by receiving satellite positioning signals from a satellite positioning system (e.g., GPS) and determining a corresponding position therefrom. This position is then augmented by combining the AGL altitude from radar altimeter 203 and terrain elevation information from an internal terrain data base to compute an augmented position. Much more accurate than the unaugmented position, this augmented position provides sufficient accuracy in the vertical dimension to allow precision approaches and landings. In addition, the augmented position is produced independently of any ground-based transmitters.

The optional components 205–210 provide added functionality by adding redundancy. The components 201–203 and the optional components 205–210 are communicatively coupled to each other via bus 204 to exchange information. Hence, system 200 of the present invention provides an added degree of redundancy, since each component (e.g., radar altimeter 203) can cross check and process information from other components (e.g., barometric altimeter 206). In addition, flight recorder 210 is coupled to record the outputs of each of components 201–208. In so doing, flight recorder 210 facilitates trouble-shooting in case of malfunctions in system 200, recording erratic or spurious outputs, or the like. System controller 208 functions by providing computation resources needed for the implementation of more elaborate functions (e.g., filtering, output averaging, mode switching, and the like).

In the present embodiment, as shown in FIG. 2, the optional components 205–210 are included within system 200. However, it should be appreciated that optional components 205–210 can be separate pre-existing navigational instruments (e.g., a stand alone INS, barometric altimeter, and display), previously installed in the aircraft. In such case, system 200 is coupled to the pre-existing navigational instruments by coupling them to bus 204 (e.g., via standard RS-232 port, Milstd 1553 bus, etc.). Accordingly, it should be appreciated that the system controller 208 and its functionality may be integrated within one of the components of system 200 (e.g., one of components 201–203), as opposed to being a separate component as shown in FIG. 2.

Figure 3:
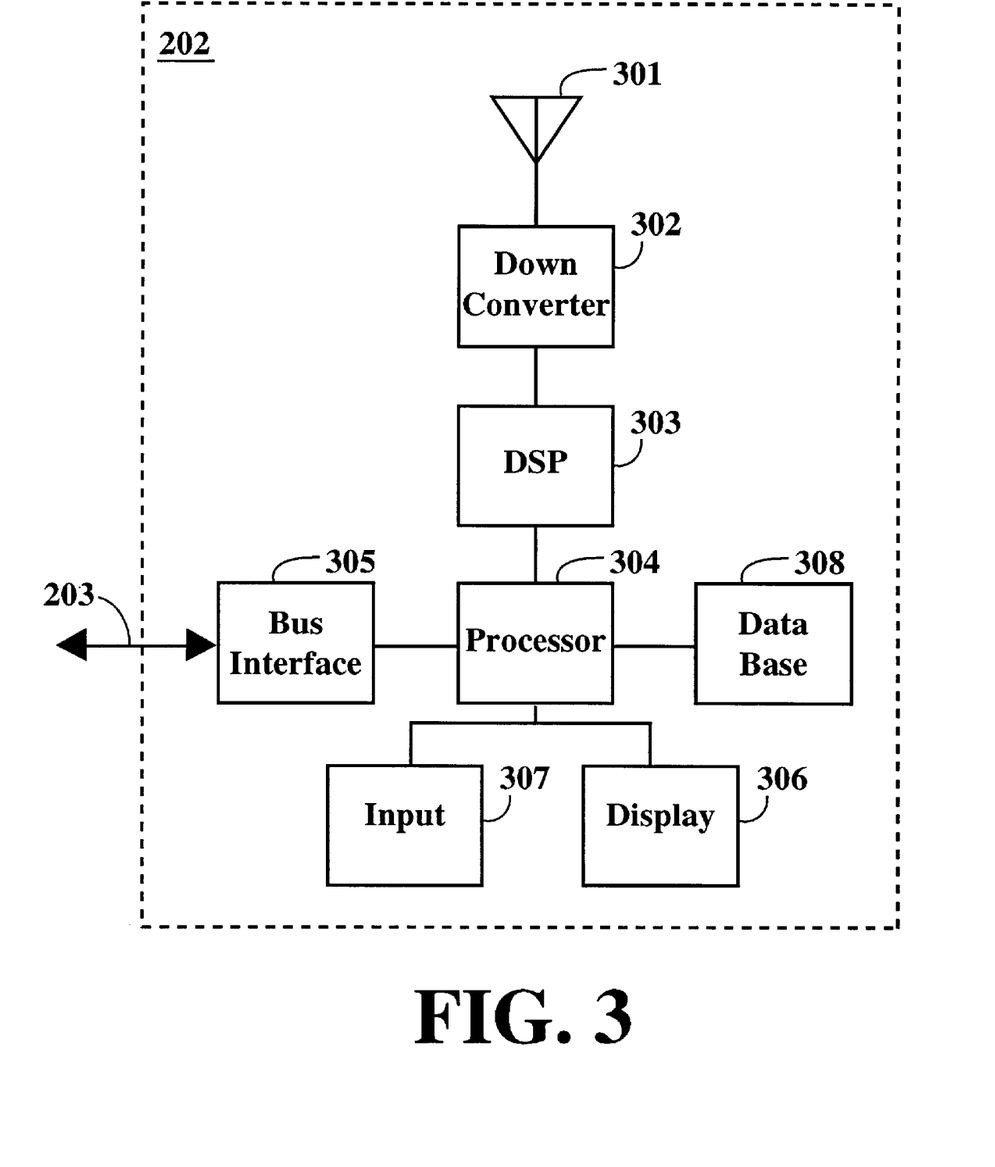
FIG. 3 shows a GPS receiver in accordance with one embodiment of the present invention.

Referring now to FIG. 3, satellite positioning system 202 in accordance with one embodiment of the present invention is shown in greater detail. In the present embodiment, satellite positioning system 202 is designed to function with the Navstar Global Positioning System (GPS) operated by the US DOD. It should be appreciated, however, that satellite positioning system 202 can also be designed to function with the Global Navigation Satellite System (GLONASS) operated by the former Soviet Union in conjunction with, or alternative to, GPS.

In the present embodiment, satellite positioning system 202 (hereafter SPS 202) includes an antenna 301 for receiving RF signals from GPS satellites. The GPS signals are down converted via a down converter 302 and subsequently coupled to a DSP 303 (digital signal processor). DSP 302 de-spreads and demodulates the signals and passes them to a processor 304, which computes pseudo ranges to the respective GPS satellites and determines a GPS-based PVT therefrom. Processor 304 communicates with bus 204 via a bus interface 305. Information is communicated to the user via a display 306 coupled to the processor 304. Operating modes are selected, navigation information (e.g., way points, etc.) is entered, and system 200 is configured for operation via a coupled user input 307 (e.g., a keyboard or communications port). Terrain elevation data and navigation information is stored in a data base 308.

Figure 4A:
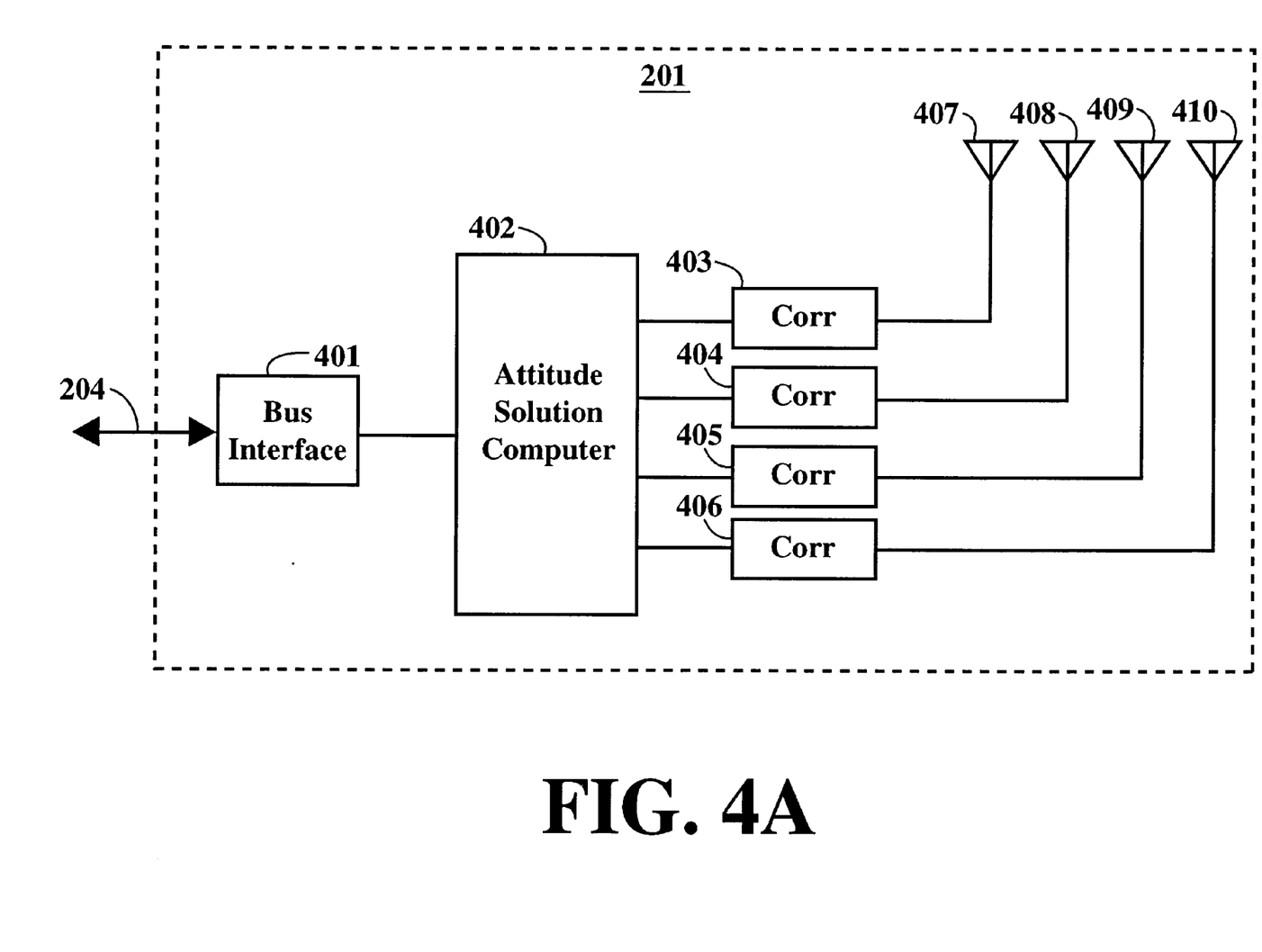
FIG. 4A shows an attitude sensor in accordance with one embodiment of the present invention.
Figure 4B:
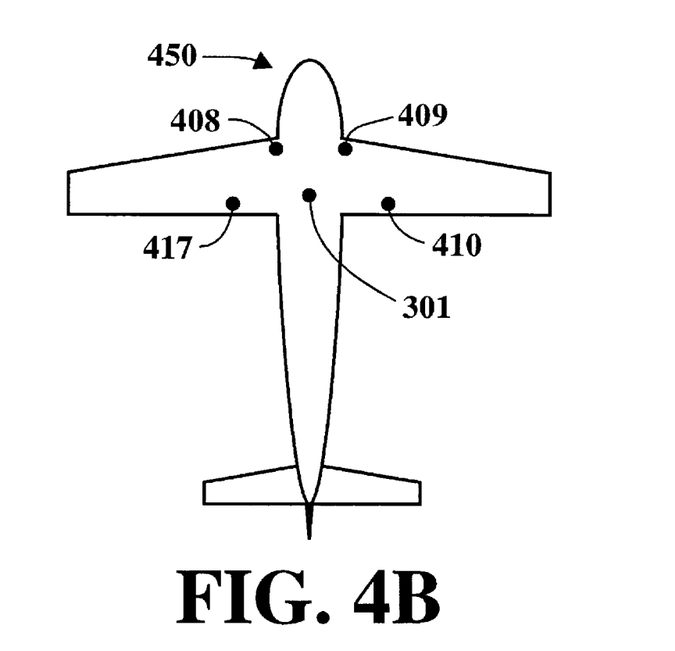
FIG. 4B shows the antenna locations of the attitude sensor and the GPS receiver on an aircraft.

FIG. 4A shows attitude sensor 201 in accordance with one embodiment of the present invention in greater detail, and FIG. 4B shows an aircraft 450 including attitude sensor 201 and system 200 with respect to an earth-centered, earth-fixed coordinate system. Referring to FIG. 4A, attitude sensor 201 functions by receiving satellite positioning signals and processing them to determine a 3-dimensional attitude with respect to an earth-centered, earth-fixed coordinate system (accounting for the fact that the aircraft's pitch, roll, and yaw are about the aircraft's center of gravity). In the present embodiment, attitude sensor 201 is designed to function with GPS. It should be appreciated, however, that attitude sensor 201, in the same manner as SPS 202, can be designed to function with GLONASS in conjunction with, or in alternative to, GPS.

In the present embodiment, attitude sensor 201 includes a bus interface 401 coupling an attitude solution computer 402 to bus 204. Attitude solution computer 402 is coupled to correlators 403–406, which are in turn coupled to antennas 407–410. GPS signals are received via each of antennas 407–410. The output of attitude solution computer 402 characterizes the attitude of aircraft 450, is coupled to bus 204 via bus interface 401, and becomes the output of attitude sensor 201. A typical attitude sensor 201 is manufactured by Trimble Navigation Limited and is referred to in the trade literature as the Vector Attitude Determination System. It should also be appreciated that other attitude determination systems used in the aviation industry can be incorporated into system 200, including those systems which do not rely upon GPS or GLONASS. Such systems would be coupled to system 200 electronically via bus 204, and thus, would need to be capable of communicating attitude information electronically.

Referring to FIG. 4B, a top view of aircraft 450 and the mounting locations of GPS antenna 310 and GPS antennas 407–410 are shown. The mounting locations of antennas 407–410 on aircraft 450 are spatially separated in order to properly measure to arriving phase of GPS signals. The GPS signal phases for the respective antennas are determined in correlators 403–406. The outputs of correlators 403–406 are coupled to attitude solution computer 402 where their relative phase differences are used to compute the attitude of the aircraft 450 with respect to the GPS signals, and hence, with respect to an earth-centered, earth-fixed coordinate system (again, accounting for the fact that the aircraft's pitch roll and yaw are about the aircraft's center of gravity).

Figure 4C:
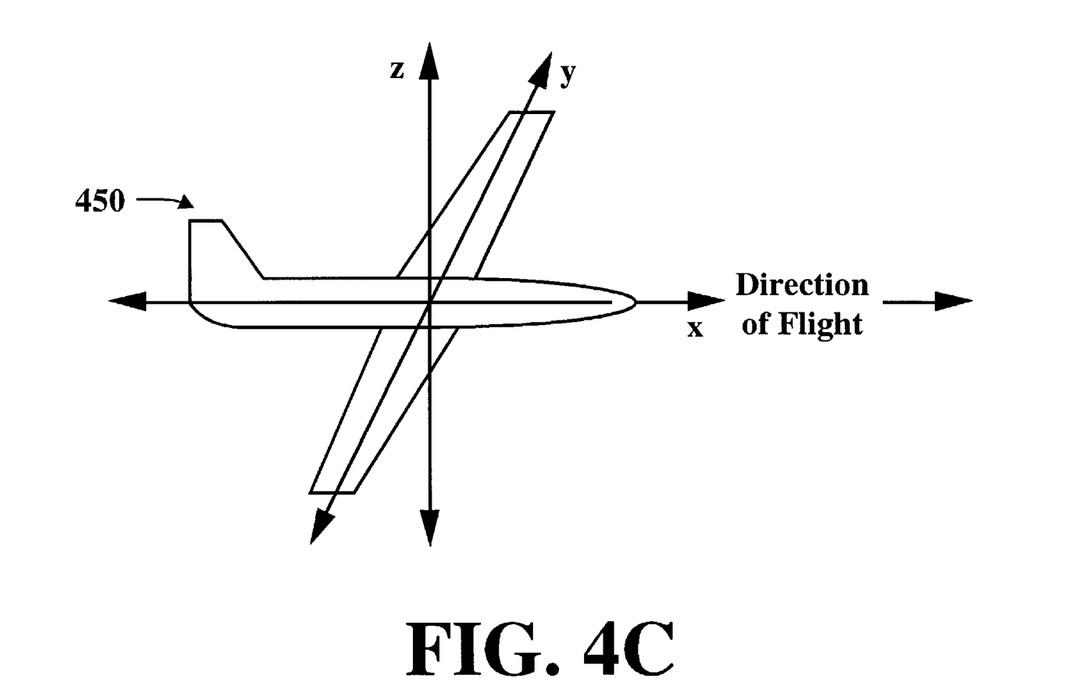
FIG. 4C shows the aircraft of FIG. 4B with respect to an earth-centered, earth-fixed coordinate system.

Referring to FIG. 4C, as the attitude of aircraft 450 changes, attitude sensor 201 detects the changes and continuously outputs (e.g., once, or more often, per second) these changes to bus 204 and the rest of system 200. Additional information regarding the operation of attitude sensor 201 can be found in U.S. Pat. No. 5,561,432, OUT OF PLANE ANTENNA VECTOR SYSTEM AND METHOD and U.S. Pat. No. 5,296,861 METHOD AND APPARATUS FOR MAXIMUM LIKELIHOOD ESTIMATION DIRECT INTEGER SEARCH IN DIFFERENTIAL CARRIER PHASE ATTITUDE DETERMINATION SYSTEMS, by Donald T. Knight, and U.S. Pat. No. 5,268,695 DIFFERENTIAL PHASE MEASUREMENT THROUGH ANTENNA MULTIPLEXING, by Michael P. Dentinger, et. al., which are each incorporated herein as background material.

Figure 5A:
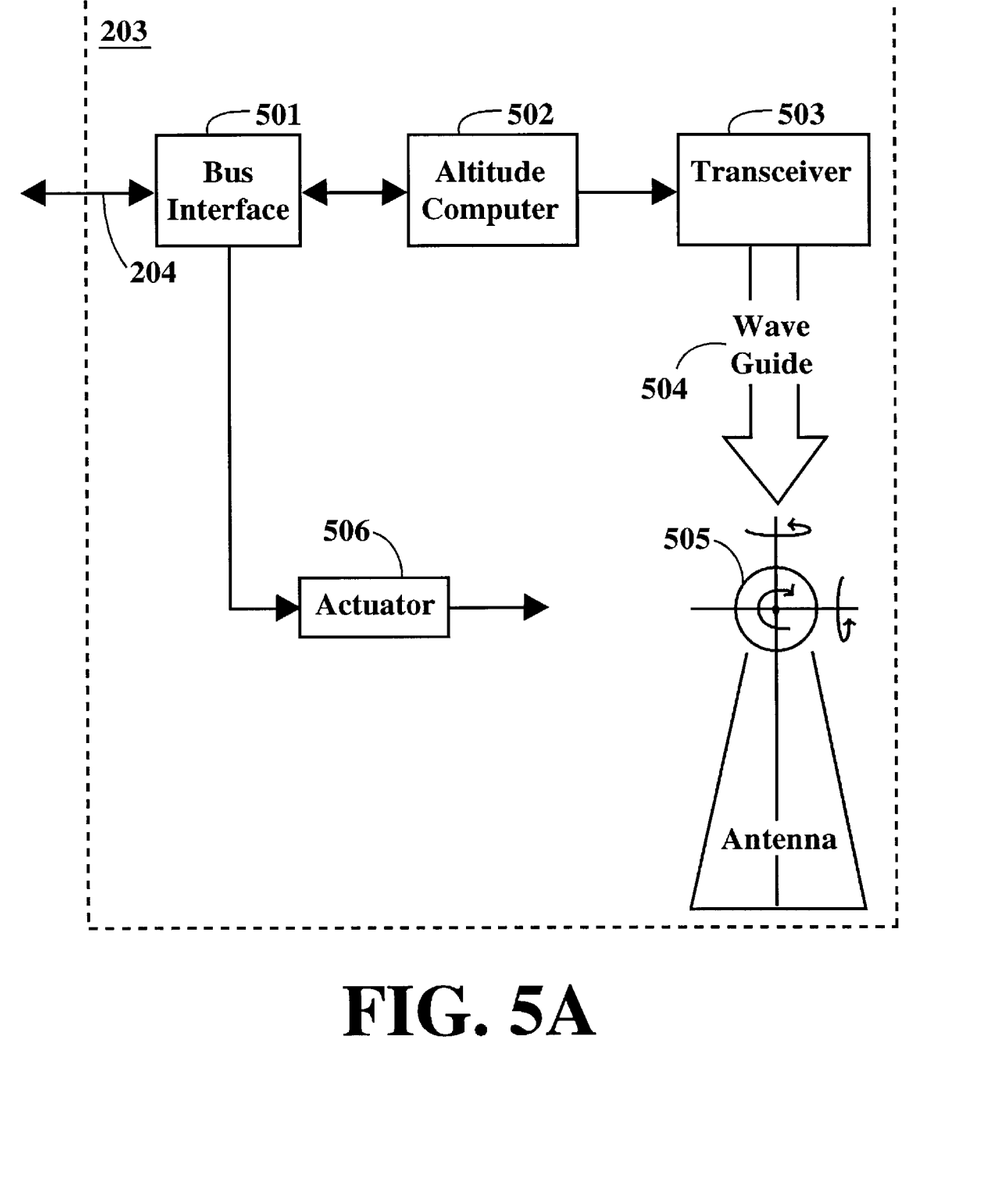
FIG. 5A shows a radar altimeter in accordance with one embodiment of the present invention.
Figure 5B:
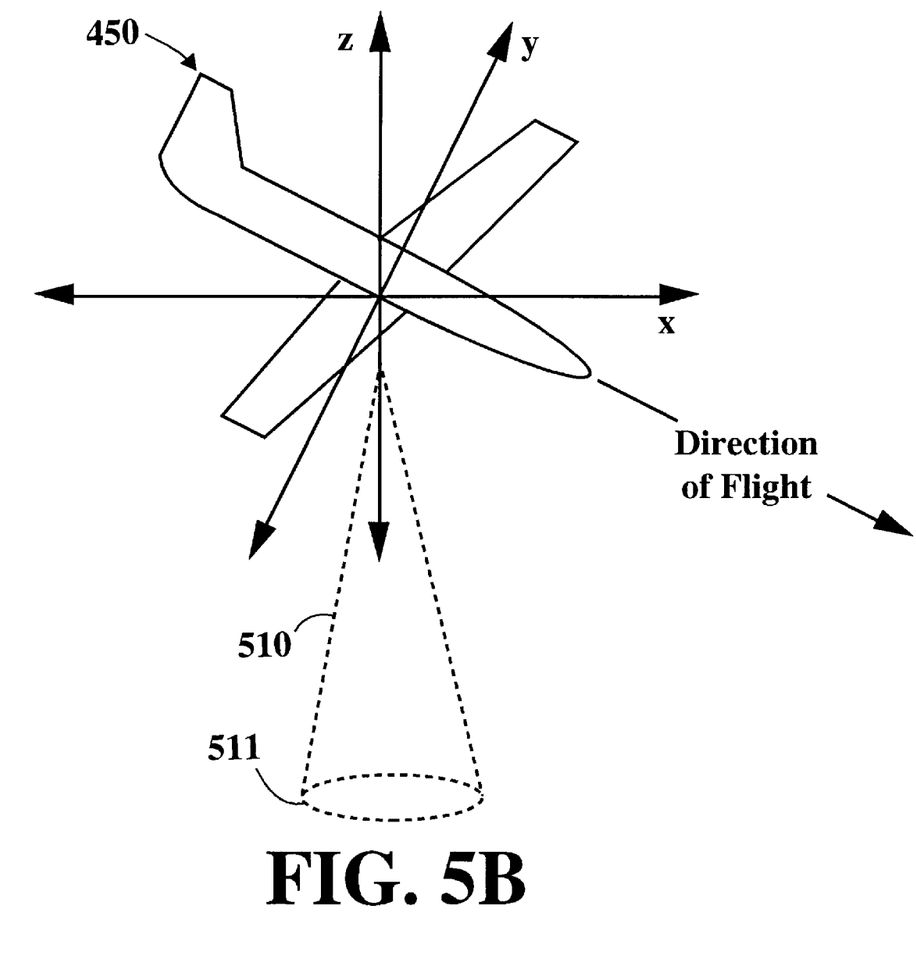
FIG. 5B shows the aircraft of FIG. 4C and an emitted radar altimeter radar beam.

Referring now to FIG. 5A and FIG. 5B, FIG. 5A shows radar altimeter 203 in accordance with one embodiment of the present invention in greater detail, and FIG. 5B shows aircraft 450 with respect to a low-observable radar beam 510. In the present embodiment, radar altimeter 203 includes a bus interface 501 coupled to bus 204 and coupled to an altitude computer 502. Altitude computer 502 is coupled to a transceiver 503, which is in turn, coupled to a wave guide 504 and a gimbaled antenna 505. Antenna 505 is also coupled to an actuator 506. Actuator 506 is coupled to bus 204 via bus interface 501.

Radar altimeter 203 functions by measuring the AGL altitude of aircraft 450. Radar altimeter 203 employs a low-observable radar beam 510 to measure the AGL altitude thereby reducing the likelihood of detection by, for example, electronic surveillance equipment. Transceiver 503 generates low-observable radar beam 510 (hereafter radar beam 510) and transmits radar beam 510 via antenna 505 to measure the AGL altitude of aircraft 450. The echo of radar beam 510 is subsequently received by transceiver 503 via antenna 505. Based upon the time delay between radar transmission and reception, in accordance with well known radar techniques, altitude computer 502 computes the AGL altitude of aircraft 450. Antenna 505 is a gimbaled antenna having rotational freedom about three axes. Actuator 506 functions by mechanically maintaining the alignment of antenna 505. Actuator 506 receives the attitude information of aircraft 450 from attitude sensor 201 (e.g., via bus interface 501 and bus 204). Altitude computer 502 (within Attitude sensor 201 as shown in FIG. 5A) then calculates the offset from normal to the airframe to point radar beam 510 to local vertical. As the attitude of aircraft 450 changes through, for example, pitch, roll, and yaw, actuator 506 maintains a proper vertical alignment of antenna 505 (e.g., parallel to the z axis). In this manner, radar altimeter 203 maintains the vertical alignment of radar beam 510 as the attitude of aircraft 450 changes.

In so doing, radar altimeter 203 continually measures the true vertical height above the underlying terrain of aircraft 450, regardless of maneuvers. In addition, the probability of detection of the low-observable radar beam 510 is minimized by maintaining the substantially vertical alignment, and hence, a minimum illuminated spot size 511 on the underlying terrain. For example, even though aircraft 450 is in a nose down attitude, as shown in FIG. 5B, the vertical alignment of radar beam 510 and the minimum spot size 511 are maintained. Consequently, the amount of scattered radar energy from radar beam 510 is minimized. This, in addition to its low observable characteristics, effects a reduction in the probability of detection of radar beam 510.

Figure 6A:
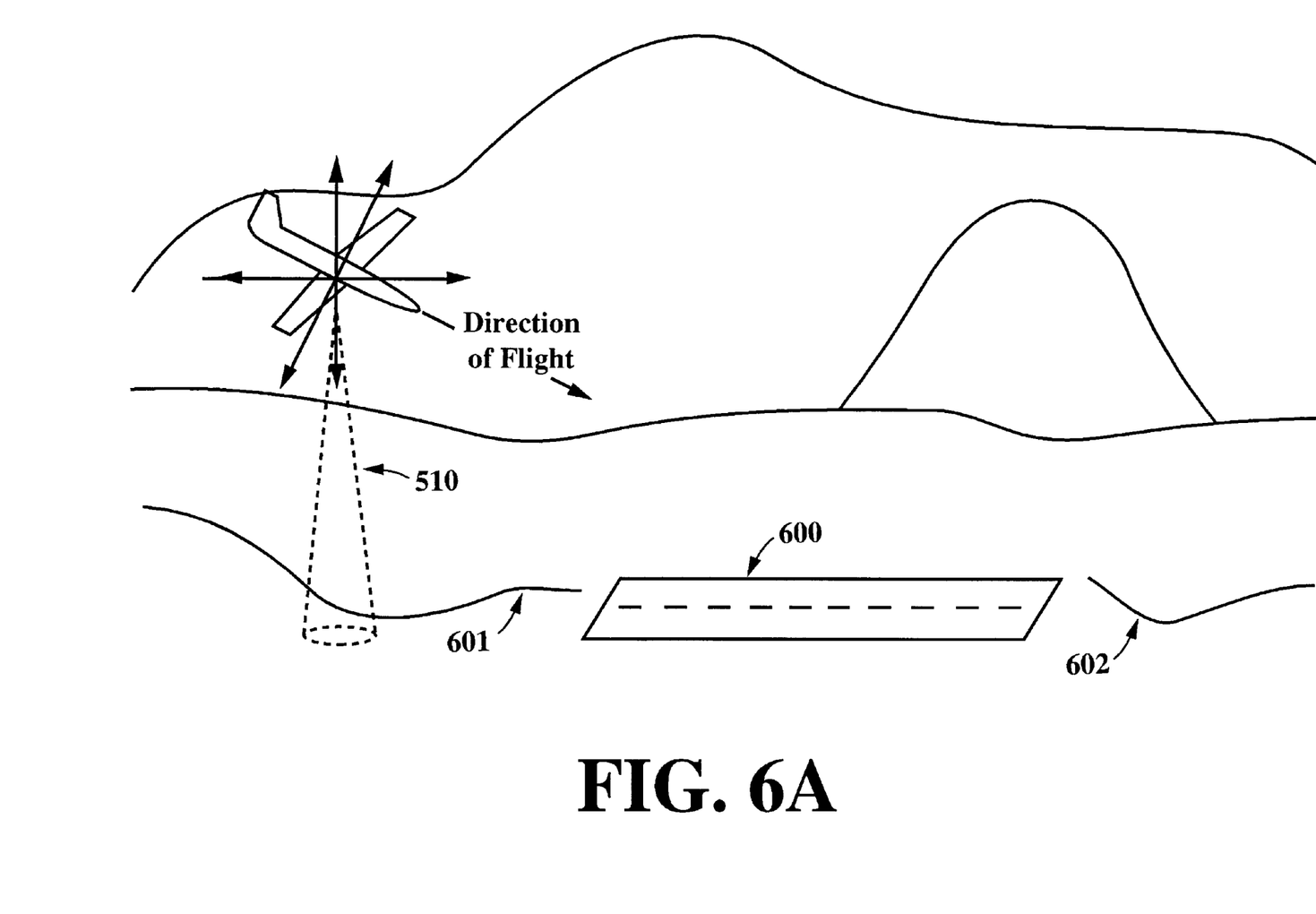
FIG. 6A shows a diagram of the aircraft of FIG. 5B and an airstrip illustrating the scheme of operation of the system of the present invention.
Figure 6B:
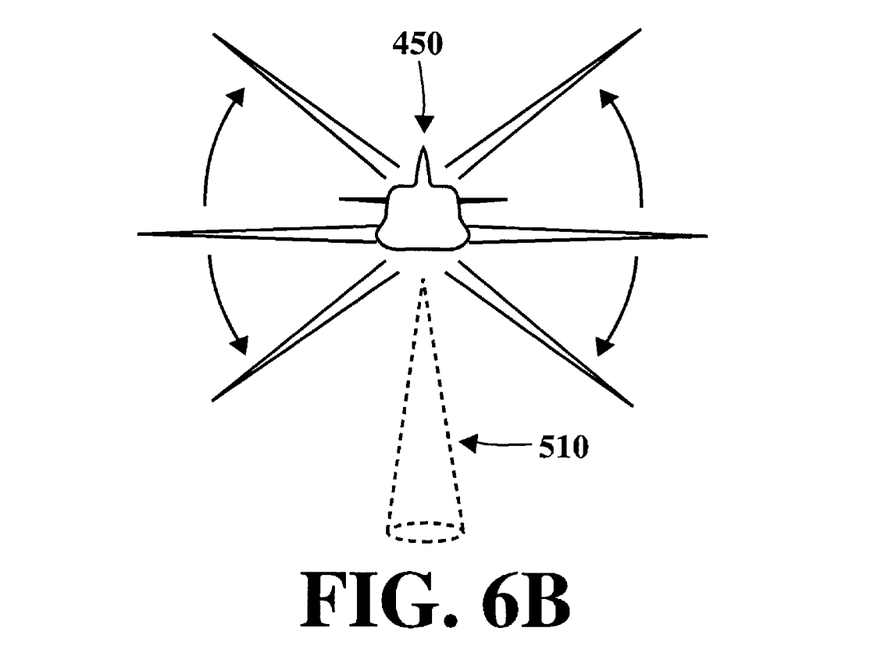
FIG. 6B shows frontal views of the aircraft of FIG. 6A in level flight, in a right bank, and in a left bank, each superimposed on the other.

With reference now to FIG. 6A and FIG. 6B, the operating scheme of system 200 and aircraft 450 is shown. FIG. 6A shows aircraft 450 executing a precision approach to remote, unimproved airstrip 600. Superimposed over aircraft 450 are the x, y, and z axes (e.g., earth-centered, earth-fixed GPS coordinate system). Radar beam 510 from system 200 is shown and the direction of flight of aircraft 450 is also indicated. FIG. 6A also shows the surrounding terrain around airstrip 600.

The terrain in the vicinity of airstrip 600, for example, terrain 601 and terrain 602, is surveyed and cataloged into a geodetic terrain data base. This data base stores the earth-centered, earth-fixed coordinates of the surface elevation of terrain 601 and 602, and is subsequently loaded in SPS 202 of FIG. 3 and stored in data base 308. Hence, SPS 202 is aware of the GPS altitude of any point on the surface of the terrain in the vicinity of airstrip 600 (e.g., terrain 601 and terrain 602). Consequently, AGL altitude measurements from radar altimeter 203 are used to greatly increase the accuracy and the stability of the GPS positions measured by SPS 202.

FIG. 6B shows radar beam 510 and frontal views of aircraft 450 in level flight, in a left bank, and in a right bank, with each view superimposed on the other. The AGL altitude measurements of radar altimeter 203 and the GPS based altitude of aircraft 450 are blended according to well known filtering and blending techniques, typically using Kalman filtering, yielding a very accurate, radar altimeter augmented GPS position, particularly in the vertical dimension (e.g., the z axis). The AGL altitude measurements are accurate even though the attitude of aircraft 450 may be changing due to turns, descents, etc., since radar altimeter 203 maintains the vertical alignment of radar beam 510 throughout the maneuvers. The constant, accurate vertical alignment of radar beam 510, in turn, ensures the accuracy of the radar altimeter augmented GPS position. In addition to improving accuracy, the AGL altitude measurements provide a degree of fault detection since they are used to confirm a predicted AGL altitude based upon the GPS position.

The radar altimeter augmented position is used to improve the accuracy of INS 205 and is used to generate a highly accurate moving map display on display 207. Barometric altimeter 206 provides redundancy for the AGL altitude measurements from radar altimeter 203. INS 205 provides redundancy for the GPS position of SPS 202. In addition to fault detection, the combined outputs from INS 205 and barometric altimeter 206 allow system 200 to continue providing navigable data if the GPS signals are briefly interrupted. This capability greatly increase the aircrew's confidence level in the integrity and reliability of the radar altimeter augmented GPS position information. Using the radar altimeter augmented position information, aircraft 450 safely executes a precision approach and landing to airstrip 600.

It should be noted that airstrip 600 is an unimproved remote airstrip. As such, there are no ground-based transmitters for facilitating aircraft precision approaches or landings. In the prior art, approaches and landings to such an airstrip could be conducted only under relatively mild weather conditions. For example, no approaches and landings could be safely executed under low cloud ceilings or in fog. Due to the surrounding terrain, approaches at night would also be unsafe. Hence, conventionally equipped aircraft could use airstrip 600 only during daylight, clear weather conditions.

These restrictions can be quite disadvantageous. For example, in the case of civilian air transport carriers operating in undeveloped or remote regions of the world, there are typically not many fully-surveyed, fully-instrumented airports. Alternative landing sites are few. With respect to the people of the region itself, there may simply be no other suitable transportation alternatives available to them. The surrounding terrain and condition of the surrounding roads (or lack thereof) may require operation at airstrip 600. In the case of military airlift operations, there may be no alternative suitable to the requirements of a particular mission. Operational requirements may simply dictate the need to fly into and out of airstrip 600.

In the case of the military, there are other operational advantages of system 200 of the present invention. Radar beam 510 emitted from radar altimeter 203 is a low-observable radar beam. Radar beam 510 includes RF characteristics which reduce its probability of detection by opposing forces. These characteristics include, for example, RF frequency agility, spread spectrum RF components, low transmitted power, and the like. Radar altimeter 203, as described above, also maintains the vertical alignment of radar beam 510 to minimize scattered energy from the terrain.

As described above, system 200 allows operations into and out of airstrip 600 without external ground-based transmitters. In the case of military operations, such reliance would be unacceptable. Ground-based transmitters (e.g., DGPS reference stations, IBLS beacons, mobile ILS, etc.) would be highly visible from a detection stand point, and hence, vulnerable. Pre-existing ground-based transmitters may not be reliable. If mobile ground-based transmitters are inserted for use, the mobile ground-based transmitters would require additional airlift capacity, and would still not address delectability issues. In contrast, system 200 of the present invention allows independent, reliable, and safe operation of aircraft (e.g., aircraft 450) into airstrip 600. In addition, the low-observable characteristics of system 200 greatly reduce delectability, and hence, vulnerability.

Figure 6C:
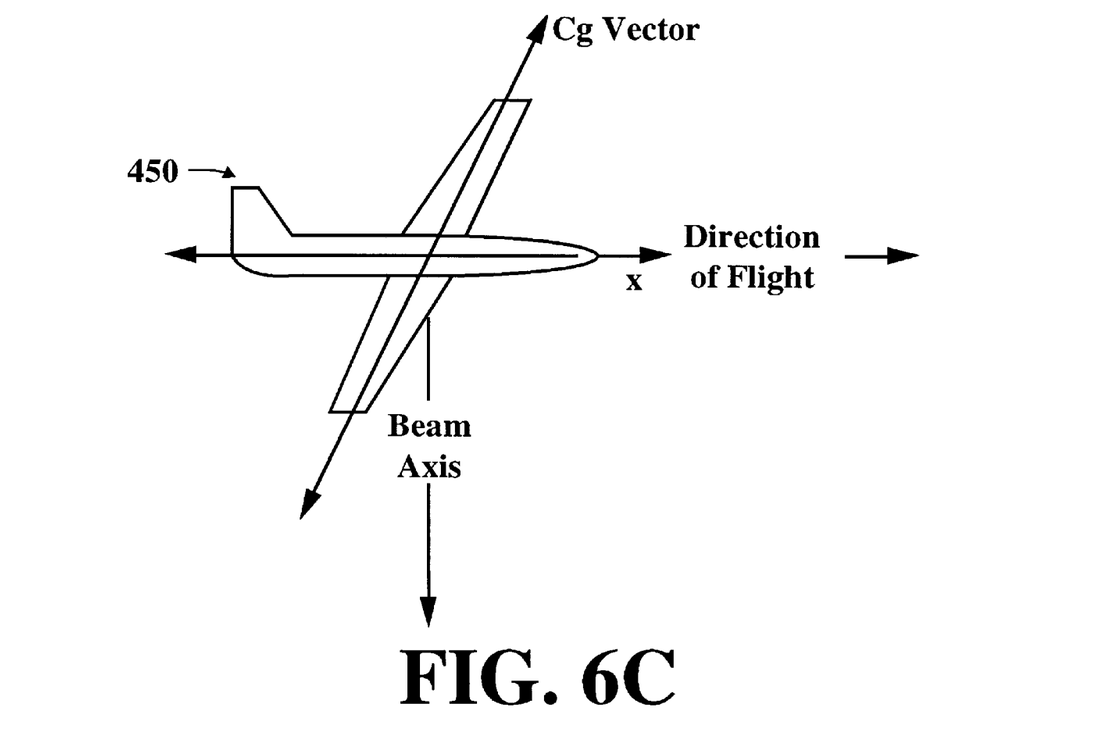
FIG. 6C shows a diagram of an aircraft having a fixed antenna for transmitting the radar altimeter radar beam.
Figure 6D:
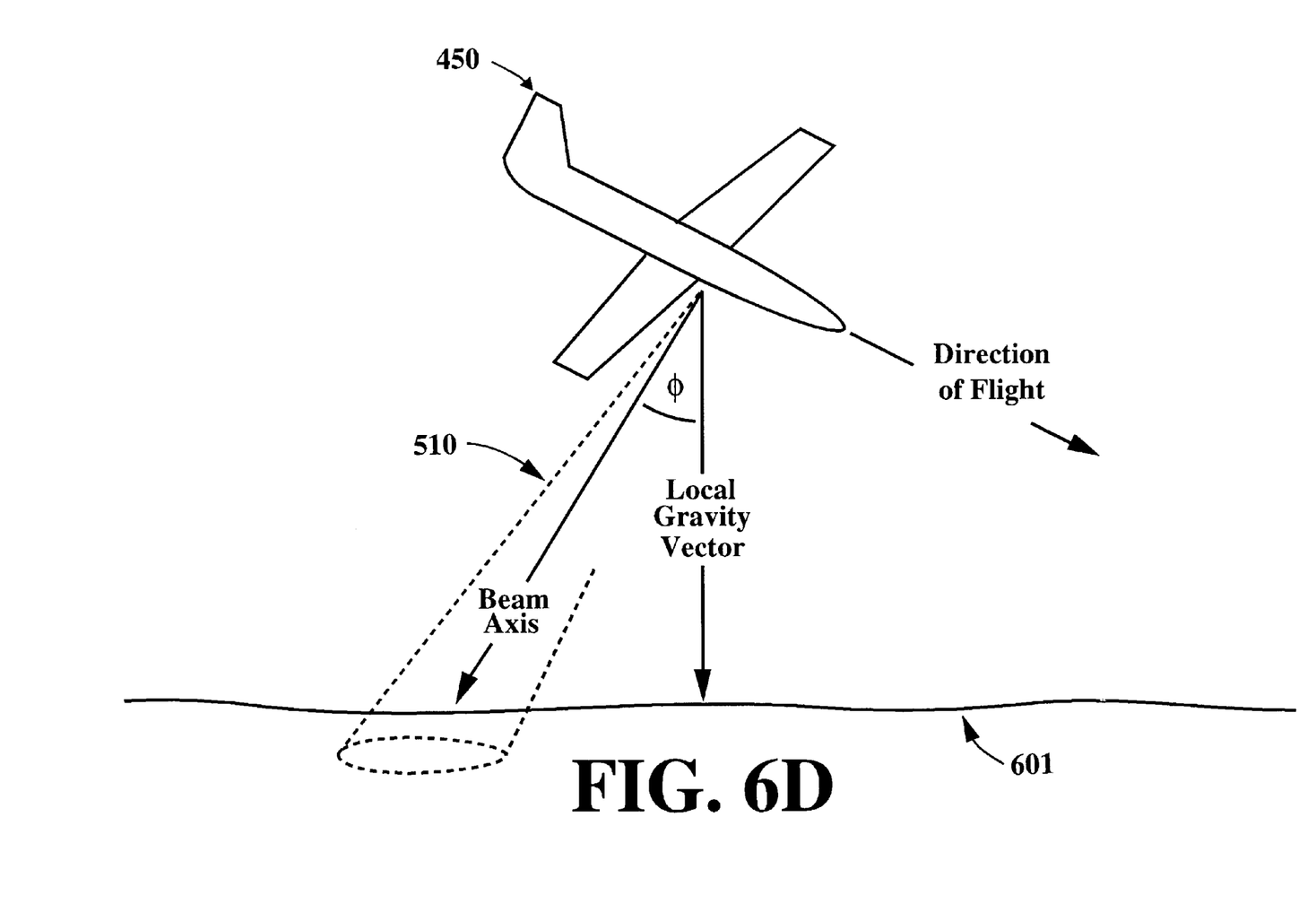
FIG. 6D shows a diagram of the aircraft of FIG. 6C in a nose down attitude with respect to underlying terrain.

With reference now to FIG. 6C and FIG. 6D, an alternative method of operation of the present invention is shown. FIG. 6C shows aircraft 450 with respect to a center of gravity vector (Cg) and the direction of flight. FIG. 6D shows aircraft 450 in a nose down attitude with respect to a local gravity vector and the underlying surface 601.

In this alternative embodiment, a fixed antenna is used to transmit radar beam 510 as opposed to gimbaled antenna 505. The fixed antenna is oriented such that the beam axis for radar beam 510 is orthogonal to a Cg vector passing laterally through the center of gravity of aircraft 450 and the flight vector from the direction of flight, as shown in FIG. 6C. Since the antenna is fixed to the airframe of the aircraft, the beam axis changes with respect to the local gravity vector, and hence, the distance measured by radar beam 510 changes.

In the present alternative embodiment, however, the changes in the distance measured by radar beam 510 are compensated for mathematically, as opposed to using a gimbal to physically orient the antenna in accordance with the local gravity vector. System 200 calculates the true AGL altitude using geometric principles.

For example, in a case where aircraft 450 is not flying in a plane normal to the local gravity vector, as shown in FIG. 6D, the beam axis of the main lobe of radar beam 510 will form an angle Ø with the local gravity vector. Hence, in the same manner that the information from the attitude sensor 201 can be used to direct radar beam 510 to a substantially vertical attitude, system 200 can solve for the AGL altitude of aircraft 450. For example, for the aircraft attitude shown in FIG. 6D, system 200 solves for the AGL altitude using the relationship: AGL altitude(t)=(cos Ø)RPL(t), where "t" is a specific time and RPL is the actual radar path length measured by radar beam 510 along the beam axis. Additionally, system 200 can use solid geometry principles to obtain the AGL altitude in the case where there are both roll angle Ø and pitch angle Ø. See U.S. Pat. No. 5,644,318, SATPS DYNAMIC SURVEYING FROM A MOVING PLATFORM, by Janky, et al., which is incorporated herein, for methods of related art.

In addition, it should be appreciated that system 200 can use several methods to combine the AGL altitude with the GPS position. Such methods include for example, direct replacement, Kalman filtering, minimum least square techniques, and the like. See U.S. Pat. No. 5,646,857, USE OF AN ALTITUDE SENSOR TO AUGMENT AVAILABILITY OF GPS LOCATION FIXES, by McBurney et. al., which is incorporated herein by reference, for additional methods and discussion of related art.

Figure 7:
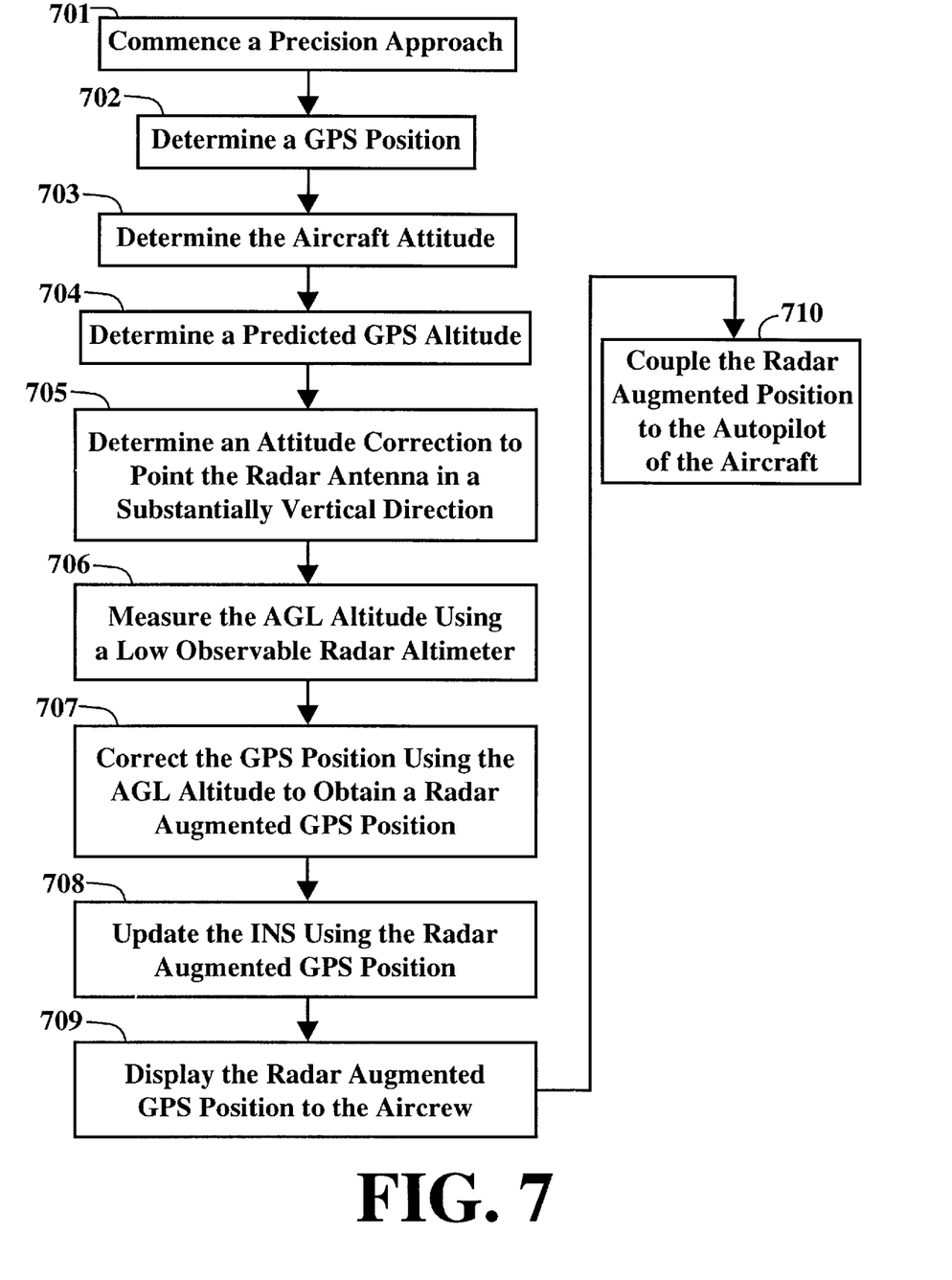
FIG. 7 shows a flow chart of the steps of a process in accordance with one embodiment of the present invention.

With reference now to FIG. 7, a flow chart of the steps of a method 700 in accordance with one embodiment of the present invention is shown. Method 700 shows the operating process of a system in accordance with the present invention (e.g., system 200, including optional components 205–210) as an aircraft (e.g., aircraft 450) executes a precision approach and landing to an unimproved airstrip (e.g., airstrip 600).

In step 701, aircraft 450 commences a precision approach to airstrip 600. As described above, the terrain surrounding the airstrip and the airstrip itself are geodetically surveyed and the terrain elevation data stored in data base 308 within SPS 202 of FIG. 3. When the aircrew initiates the precision approach, for example, the appropriate terrain elevation data is accessed.

In step 702, SPS 202 determines a GPS position for aircraft 450. As described above, in the present embodiment, SPS 202 is designed to function with the Navstar GPS system. In the case of military users, SPS 202 receives the more accurate PPS (precise positioning service) GPS signals.

In step 703, using the same signals, attitude sensor 201 determines the attitude of aircraft 450. As described above, attitude sensor 201 uses the phase differences between four GPS antennas to determine the attitude of aircraft 450 with respect to an earth-centered, earth-fixed coordinate system. This attitude is coupled to the other components of system 200 (e.g., radar altimeter 203) via bus 204.

In step 704, SPS 202 determines a predicted AGL altitude above the surface of the underlying terrain for aircraft 450. The terrain elevation data is stored in data base 308 within SPS 202. Comparing the GPS position to the GPS coordinates of the terrain directly beneath aircraft 450 yields the predicted AGL altitude.

In step 705, the altitude computer of radar altimeter 203 determines an attitude correction required to point the radar altimeter in a substantially vertical direction. As described above, this correction is used to drive actuators coupled to the radar antenna.

In step 706, radar altimeter 203 uses a low-observable radar beam 510 to measure the AGL altitude of aircraft 450 above the underlying terrain. As described above, radar altimeter 203 uses the attitude information from attitude sensor 201 to maintain the vertical alignment of radar beam 510. In so doing, an accurate AGL altitude is measured and the probability of detection of the low-observable radar beam 510 is minimized. For redundancy and to guard against errors, the AGL altitude is cross checked against a barometric altitude from barometric altimeter 206, and the predicted GPS altitude (to guard against, for example, gross AGL altitude errors).

In step 707, the GPS position of aircraft 450 is corrected using the AGL altitude to obtain an augmented GPS position. As described above, this augmented GPS position is much more accurate than the GPS position. The augmented GPS position is subsequently cross checked against the INS position from INS 205 for reliability, redundancy, and fault detection.

In step 708, INS 205 is updated using the augmented GPS position. This provides an added degree of redundancy. Should the GPS signals subsequently become temporarily unavailable prior to landing (e.g., jamming, interference, etc.), aircraft 450 can still complete the approach using INS and barometric altimeter data.

In step 709, system 200 displays the augmented GPS position to the aircrew via display 207 (e.g., a color coded moving map). This increases the situational awareness of the aircrew and provides them with a means of visually monitoring the performance of system 200.

In step 710, the augmented GPS position information is coupled to the autopilot of aircraft 450. This allows the autopilot to fly the approach, adjusting the flight path of aircraft 450 in response to the augmented GPS position information provided by system 200. Hence, aircraft 450 is able safely to execute the precision approach and automatically land on airstrip 600.

Thus, the present invention provides a system which provides an improved positioning accuracy in comparison to prior art GPS. The present invention provides sufficient accuracy in the vertical dimension to allow precision approaches and landings and is independent of ground-based transmitters. The system of the present invention is capable of functioning during interruptions of GPS signals (e.g., interference, jamming, etc.). In addition, the system of the present invention provides an added degree of redundancy, providing an additional source of navigation information for use in conjunction with other pre-existing aircraft navigation instruments (e.g., INS, ILS, TACAN, etc.).

Figure 8:
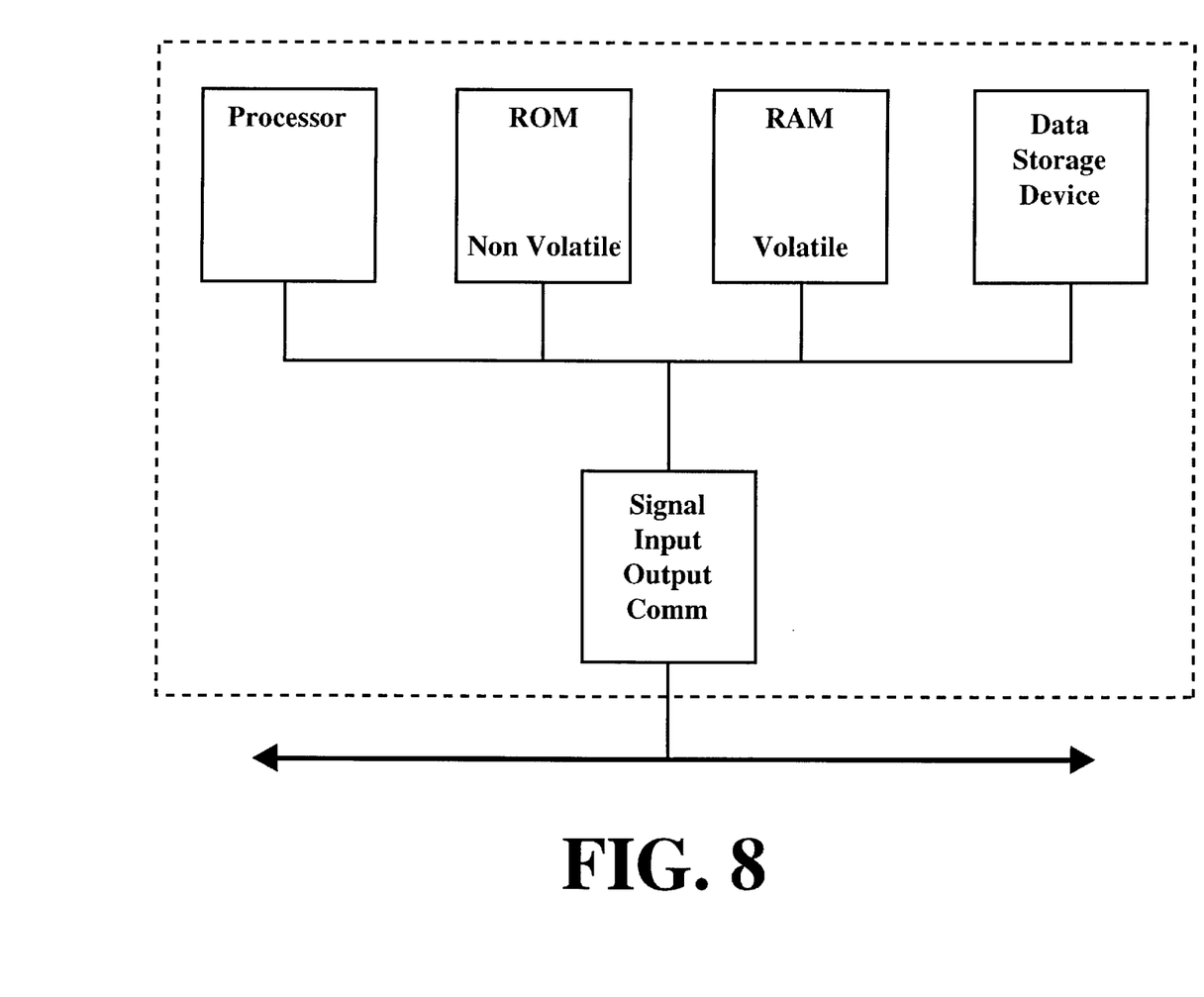
FIG. 8 shows a diagram of the system controller of FIG. 2 in greater detail.

Referring now to FIG. 8, system controller 208 in accordance with one embodiment of the present invention is shown. Within the following discussions of the present invention, certain processes and steps are discussed that are realized, in one embodiment, as a series of instructions (e.g., software program) that reside within computer readable memory units of system controller 208 and executed by processors of system controller 208. When executed, the instructions cause the computer system controller 208 to perform specific actions and exhibit specific behavior which is described herein.

In general, computer system controller 208 used by the present invention comprises an address/data bus 800 for communicating information, one or more central processors 801 coupled with the bus 800 for processing information and instructions, a computer readable volatile memory unit 802 (e.g., random access memory, static RAM, dynamic RAM, etc.) coupled with the bus 800 for storing information and instructions for the central processor(s) 801, and a computer readable non-volatile memory unit 803 (e.g., read only memory, programmable ROM, flash memory, EPROM, EEPROM, etc.) coupled with the bus 800 for storing static information and instructions for the processor(s) 801. System controller 208 communicates with system 200 of FIG. 2 via an interface 804 which interfaces system controller 208 with bus 204 (by implementing communications protocols such as IEEE485, etc.). It should be appreciated that, although in the present embodiment, software programs are hosted on system controller 208, the software programs can be hosted on other components of system 200 (e.g., components 201–203) which include the necessary computation resources.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A low-observable radar altimeter augmented SPS (satellite positioning system) navigation system for use on an aircraft, comprising:
   a SPS receiver for receiving a GPS signal and determining a position therefrom;
   an attitude sensor coupled to said SPS receiver, said attitude sensor adapted to determine three dimensional attitude information for said aircraft;
   a radar altimeter coupled to said SPS receiver and coupled to said attitude sensor, said radar altimeter adapted to measure an AGL (above ground level) altitude of said aircraft using a radar beam, said radar altimeter coupled to said attitude sensor and adapted to use said attitude information to maintain said radar beam in a substantially vertical attitude with respect to said aircraft to increase the accuracy of said position.

2. The system of claim 1, wherein said radar beam is a low-observable radar beam.

3. The system of claim 1, wherein said attitude determination system is adapted to receive said GPS signal and determine said three dimensional attitude information therefrom.

4. The system of claim 3, wherein said attitude sensor is adapted to receive a GLONASS (global navigation system) signal or said GPS signal.

5. The system of claim 1, wherein said SPS receiver is adapted to receive a GLONASS signal or said GPS signal.

6. The system of claim 1, further including a data base coupled to said SPS receiver for storing terrain coordinate information, wherein said terrain coordinate information, said position, and said AGL altitude are blended to increase the accuracy of said position.

7. The system of claim 1, wherein said radar altimeter maintains said radar beam in said substantially vertical attitude by actuating a gimbaled antenna in response to attitude correction information received from said attitude sensor.

8. The system of claim 1, wherein said radar altimeter maintains said radar beam in said substantially vertical attitude by controlling a phased array antenna in response to attitude correction information received from said attitude sensor.

9. The system of claim 1, further including an INS (inertial navigation system) coupled to said SPS receiver to provide a redundant INS determined position to said SPS receiver.

10. The system of claim 1, further including a barometric altimeter coupled to said radar altimeter to provide redundancy.

11. The system of claim 1, further including a display coupled to said SPS receiver for displaying information and accepting input.

12. The system of claim 1, wherein said SPS receiver is adapted to couple to a autopilot of said aircraft to automatically provide guidance.

13. A radar altimeter augmented GPS navigation system, comprising:
- a GPS receiver for receiving a GPS signal and determining a position therefrom;
- an attitude sensor coupled to said GPS receiver, said attitude sensor adapted to determine a three dimensional attitude of an aircraft;
- a radar altimeter coupled to said GPS receiver and coupled to said attitude sensor, said radar altimeter adapted to measure an AGL (above ground level) altitude of said aircraft using a radar beam, said radar altimeter coupled to said attitude sensor and adapted to use said attitude of said aircraft to maintain said radar beam in a substantially vertical attitude with respect to said aircraft; and
- a data base coupled to said GPS receiver for storing terrain coordinate information, wherein said terrain coordinate information is blended with said AGL altitude and said GPS position to determine an augmented position having increased accuracy with respect to said GPS position.

14. The system of claim 13, wherein said radar beam is a low-observable radar beam.

15. The system of claim 13, wherein said attitude determination system is adapted to receive said GPS signal and determine said three dimensional attitude information therefrom.

16. The system of claim 13, wherein said GPS receiver and said attitude sensor are adapted to receive a GLONASS signal.

17. The system of claim 13, wherein said radar altimeter maintains said radar beam in said substantially vertical attitude by actuating a gimbaled antenna in response to said attitude received from said attitude sensor.

18. The system of claim 13, wherein said radar altimeter maintains said radar beam in said substantially vertical attitude by controlling a phased array antenna in response to said attitude received from said attitude sensor.

19. The system of claim 13, further including a INS (inertial navigation system) coupled to said GPS receiver to provide a redundant INS determined position to said GPS receiver.

20. The system of claim 13, further including a barometric altimeter coupled to said radar altimeter to provide redundancy.

21. A method for providing radar altimeter augmented GPS navigation information to enable an aircraft to execute a precision approach and landing independent of ground-based transmitters, the method comprising the steps of:
a) determining a GPS position by using a GPS receiver receiving a GPS signal and determining said GPS position therefrom;
b) determining a three dimensional attitude of an aircraft by using an attitude sensor receiving said GPS signal and determining said attitude therefrom;
c) measuring an AGL altitude of said aircraft by using a radar altimeter, wherein said radar altimeter transmits a low-observable radar beam having a low probability of detection;
d) maintaining said radar beam in a substantially vertical attitude with respect to said aircraft by using said attitude from said attitude sensor;
e) combining said AGL altitude and said GPS position to compute an augmented GPS position having increased accuracy with respect to said GPS position; and
f) executing a precision approach and landing by using said augmented GPS position.

22. The method of claim 21 further including the step of receiving a GLONASS signal using said GPS receiver and determining a GLONASS position therefrom.

23. The method of claim 21 further including the step of receiving a GLONASS signal using said attitude sensor and determining said attitude therefrom.

24. The method of claim 21 further including the step of determining an INS position and using said INS position provide redundancy and fault detection.

25. A radar altimeter augmented GPS navigation system, comprising:
- a GPS receiver for receiving a GPS signal and determining a position therefrom;
- an attitude sensor coupled to said GPS receiver, said attitude sensor adapted to receive said GPS signal and determining a three dimensional attitude of an aircraft including said GPS receiver therefrom;
- a radar altimeter coupled to said GPS receiver and coupled to said attitude sensor, said radar altimeter adapted to measure a radar path length along a radar beam emitted by said radar altimeter, said attitude and said radar path length used to compute an accurate AGL (above ground level) altitude of said aircraft; and
- a data base coupled to said GPS receiver for storing terrain coordinate information, wherein said terrain coordinate information is blended with said AGL altitude and said GPS position to determine an augmented position having increased accuracy with respect to said GPS position.

26. The system of claim 25, wherein said GPS receiver and said attitude sensor are adapted to receive a GLONASS signal.

27. The system of claim 25, wherein said radar altimeter includes a radar antenna fixed with respect to said aircraft, and wherein said attitude and said radar path length are used to compute said AGL altitude as said AGL altitude varies with a maneuver of said aircraft.

28. The system of claim 25, further including a INS (inertial navigation system) coupled to said GPS receiver to provide a redundant INS determined position to said GPS receiver.

29. The system of claim 25, further including a barometric altimeter coupled to said radar altimeter to provide redundancy.

30. The system of claim 25, further including a flight recorder adapted to record the outputs of said GPS receiver, said attitude sensor, and said radar altimeter.

31. The system of claim 25, further including a system controller adapted to interface said GPS receiver, said attitude sensor, and said radar altimeter.

32. The system of claim 31, wherein said system controller uses said attitude with said radar path length to compute said AGL altitude.

33. The system of claim 25, wherein said GPS signal is a standard positioning service GPS signal.

34. The system of claim 25, wherein said GPS signal is a precise positioning service signal.

* * * * *